(12) United States Patent
Genossar et al.

(10) Patent No.: US 6,731,710 B1
(45) Date of Patent: May 4, 2004

(54) METHOD FOR RAPID CARRIER FREQUENCY ESTIMATION IN A COMMUNICATION SYSTEM

(75) Inventors: Michael Joshua Genossar, Rosh Ha'ayin (IL); Max Gotman, Kfar Saba (IL); Natan Mizrahi, Tel Aviv (IL); Naftali Chayat, Kfar Saba (IL)

(73) Assignee: Alvarion Ltd., Tel Aviv (IL)

( * ) Notice: Subject to any disclaimer, the term of this patent is extended or adjusted under 35 U.S.C. 154(b) by 0 days.

(21) Appl. No.: 09/162,996

(22) Filed: Sep. 30, 1998

(51) Int. Cl.[7] ................................................. H04L 7/04
(52) U.S. Cl. ........................ 375/362; 375/226; 375/372
(58) Field of Search ............................... 375/226, 224, 375/362, 371, 372, 365, 370, 368, 367

(56) References Cited

U.S. PATENT DOCUMENTS 6,097,770 A * 8/2000 Bahai et al. ................ 375/343

6,292,651 B1 * 9/2001 Dapper et al. .............. 370/342

OTHER PUBLICATIONS

U.S. application Ser. No. 09/162,995, Genossar et al., filed Sep. 1998.
A fast and accurate single frequency estimator, S. Kay, IEEE Transaction on Acoustics, Speech and Signal Processing, vol. 37, No. 12, Dec. 1989, pp. 1987–1990.

* cited by examiner

Primary Examiner—Emmanuel Bayard
Assistant Examiner—Pankaj Kumar
(74) Attorney, Agent, or Firm—Mark M. Friedman

(57) ABSTRACT

A modem for more efficiently processing a received analog signal into a digital output. The modem preferably estimates the carrier frequency offset in at least one stage, by receiving a synchronization field divided into at least two portions, calculating a difference of the phase between the portions, and then calculating the frequency offset from the phase difference. More preferably, the modem estimates the carrier frequency offset in two stages, with a first stage being a initial frequency estimate of the offset.

1 Claim, 6 Drawing Sheets

US 6,731,710 B1

METHOD FOR RAPID CARRIER FREQUENCY ESTIMATION IN A COMMUNICATION SYSTEM

FIELD AND BACKGROUND OF THE INVENTION

The present invention relates to a method for rapid carrier frequency estimation in a communication system.

Communication systems feature a transmitter and a receiver. In order for communication to occur, a transmitted signal must be accurately processed by the receiver for accurate recovery of the information contained within the signal.

For example, radio frequency signals are subject to distortion such as amplitude and phase distortion and carrier frequency offset. Amplitude and phase distortion, which cause time dispersion, are known as channel response. The transmission frame may include synchronization fields, which are required for correct processing of the frame to overcome the above-mentioned distortions, yet which must be minimized in order to maximize the available bandwidth. For example, for communication protocols which feature bursty transmissions, each burst may include synchronization fields. For example, these fields may appear at the beginning of the burst, and then they form the header. When bursts are relatively short, the synchronization overhead must be decreased as much as possible, such that the synchronization field must be as short as is practical.

Part of the processing of the synchronization field involves the estimation of the carrier frequency offset. The frequencies by which the signal are modulated, upconverted, downconverted and demodulated have some deviation from their ideal values. The sum of all these deviations is the carrier frequency offset. The estimation of the carrier frequency offset is necessary for processing the received signal. Methods for rapidly estimating the carrier frequency offset in the presence of channel distortion such as ISI (intersymbol interference) would therefore be very useful.

There is thus a widely recognized need for, and it would be highly advantageous to have, a system and a method for rapidly estimating the carrier frequency offset, in order to increase the efficiency of signal processing, and decrease the length of synchronization fields, and increasing the accuracy of the estimate.

SUMMARY OF THE INVENTION

According to the present invention there is provided a method for estimating a frequency offset of at least one frame, containing at least one synchronization field being divided into at least two subsections, the at least two subsections being composed of substantially equivalent pseudorandom symbols, the frame being received by a receiver from a transmitter, the receiver including at least an analog-to-digital processing unit, the steps of the method being performed by a data processor, the steps of the method comprising: (a) determining an initial frequency offset, $f_{initial}$; (b) calculating a first phase in radians for at least a portion of a first subsection according to an equation:

$$\varphi_1 = angle\left(\sum_{i=i_m}^{i_n} a_i^* * \exp(-j*i*f_{initial}*2\pi*T_s)Y_i\right)$$

wherein i denotes time in symbols; $T_s$ is a symbol period; n and m are integers, $i_n \geq i_m$; a length of the at least a portion of the first subsection is $i_n - i_m + 1$; $Y_i$ is an output of the analog-to-digital processing unit; $a_i^*$ is the complex conjugate of the $i^{th}$ training symbol $a_i$; (c) calculating a second phase in radians for at least a portion of a second subsection according to an equation:

$$\varphi_2 = angle\left(\sum_{i=i_p}^{i_q} a_i^* * \exp(-j*i*f_{initial}*2\pi*T_s)Y_i\right),$$

wherein q and p are integers, $i_q \geq i_p$; a length of the at least a portion of the second subsection is $i_q - i_p + 1$; (d) calculating a phase difference of the first phase and the second phase angle according to an equation: $\Delta\phi = \phi_2 - \phi_1$; (e) adjusting the phase difference such that if $\Delta\phi > \pi$, then $\Delta\phi = \Delta\phi - 2\pi$, and alternatively such that if $\Delta\phi < -\pi$, then $\Delta\phi = \Delta\phi + 2\pi$; and (f) calculating the frequency offset according to an equation: $\Delta f = \Delta\phi/(\Delta t * 2\pi)$ wherein $\Delta t = (i_p - i_m) * T_s$.

Preferably, the analog-to-digital processing unit features an analog-to-digital converter and $Y_i$ is an output of the analog-to-digital converter.

Alternatively and preferably, the analog-to-digital processing unit features a receive filter and $Y_i$ is an output of the receive filter.

According to a preferred embodiment of the present invention, the first subsection features three portions, a first symbol of a first portion being denoted $i_1$, a first symbol of a second portion being denoted $i_2$, a last symbol of the second portion being denoted symbol $i_3$; and a last symbol for a third portion being denoted symbol $i_4$; and wherein the second subsection features three portions, a first symbol of a first portion being denoted $i_5$, a first symbol of a second portion being denoted $i_6$, a last symbol of the second portion being denoted symbol $i_7$; and a last symbol for a third portion being denoted symbol $i_8$; such that the second portions of the first and the second subsections are processed, such that n=3, m=2, p=6 and q=7.

According to other preferred embodiments of the present invention, the steps of the method are repeated for a plurality of frames n, such that a plurality of n frequency offsets is calculated, the method further comprising the step of: (g) averaging the plurality of n frequency offsets to obtain the frequency offset. Preferably, the step of averaging the plurality of n frequency offsets includes the following steps: (i) determining a weight $w_i$ for each frequency offset i; and (ii) calculating the frequency offset to be $\Delta f_w$ according to an equation:

$$\Delta f_w = \frac{1}{\sum_{i=1}^{n} w_i} * \sum_{i=1}^{n} (w_i * \Delta f_i)$$

Preferably, the initial frequency offset is calculated by the steps of: (i) calculating for each $f_k$ of a set of frequencies $\{f_k\}$ a set of values $T(f_k)$ according to an equation:

$$T(f_k) = \left|\sum_{i=1}^{L} a_i * \exp(-j*i*f_k*2\pi*T_s)*Y_i\right|^2$$

wherein L is a length of the synchronization field; j is the square root of −1; and (ii) determining the initial frequency offset as a value of a frequency $f_k$ such that the set of values $T(f_k)$ is maximized.

According to another embodiment of the present invention, there is provided a method for estimating a frequency offset of at least one frame, containing at least one synchronization field being divided into at least a first subsection and a second subsection separated by a spacer portion, the at least two subsections being composed of substantially equivalent pseudorandom symbols, the first subsection featuring at least three portions, a first portion having a first symbol denoted symbol $i_1$, a second portion having a first symbol denoted symbol $i_2$ and a last symbol denoted symbol $i_3$, and a third portion having a last symbol denoted symbol $i_4$, the second subsection also featuring at least three portions, a first portion having a first symbol denoted symbol $i_5$, a second portion having a first symbol denoted symbol $i_6$ and a last symbol denoted symbol $i_7$, and a third portion having a last symbol denoted symbol $i_8$, the frame being received by a receiver from a transmitter, the receiver including at least an analog-to-digital processing unit, the steps of the method being performed by a data processor, the steps of the method comprising: (a) calculating for each frequency $f_k$ of a set of frequencies $\{f_k\}$ an equation: $T(f_k)$ $$= \left| \sum_{i=1}^{L} a_i * \exp(-j * i * f_k * 2\pi * T_s) * Y_i \right|^2$$

wherein $T_s$ is a symbol period; L is a length of at least a portion of the synchronization field; j is the square root of −1; (b) determining an initial frequency estimate $f_{initial}$ as a value of a frequency $f_k$ such that a set of values $T(f_k)$ is maximized; (c) calculating a first phase in radians for the second portion of the first subsection according to an equation:

$$\varphi_1 = angle\left( \sum_{i=i_2}^{i_3} a_i^* * \exp(-j * i * f_{initial} * 2\pi * T_s) Y_i \right)$$

wherein i denotes time in symbols; a length of the second portion of the first subsection is $i_3-i_2+1$; $Y_i$ is an output of the analog-to-digital processing unit; $a_i^*$ is the complex conjugate of the $i^{th}$ symbol $a_i$; (d) calculating a second phase in radians for the second portion of the second subsection according to an equation:

$$\varphi_2 = angle\left( \sum_{i=i_6}^{i_7} a_i^* * \exp(-j * i * f_{initial} * 2\pi * T_s) Y_i \right)$$

wherein a length of the second portion of the second subsection is $i_7-i_6+1$; (e) calculating a difference of the first phase and the second phase according to an equation: $\Delta\varphi=\varphi_2-\varphi_1$; (f) adjusting the difference such that if $\Delta\varphi>\pi$, then $\Delta\varphi=\Delta\varphi-2\pi$, and alternatively if $\Delta\varphi<-\pi$, then $\Delta\varphi=\Delta\varphi+2\pi$; and (g) calculating the frequency offset according to an equation: $\Delta f=\Delta\varphi/(\Delta t*2\pi)$ wherein $\Delta t=(i_6-i_2)*T_s$.

Hereinafter, a signal which corresponds to a particular burst $S_i$ (i being an integer) is defined as having been produced by processing at least a portion of burst $S_i$, for example by sampling an analog signal obtained from the received burst $S_i$ to produce a "corresponding" digital sampled signal.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for precise and rapid estimation of the carrier frequency offset for a communication system which includes a transmitter and a receiver. The method of the present invention estimates the carrier frequency offset from the synchronization field, which preferably features a sequence of pseudorandom symbols which appears at least twice within the synchronization field. The phase angle for each of these repeated sequences is then used to determine the phase difference, from which the frequency offset is calculated. Optionally and preferably, the method also includes a coarse frequency estimate which is performed first, for example if the frequency offset is particularly large.

The principles and operation of a method according to the present invention may be better understood with reference to the drawings and the accompanying description.

Figure 1:
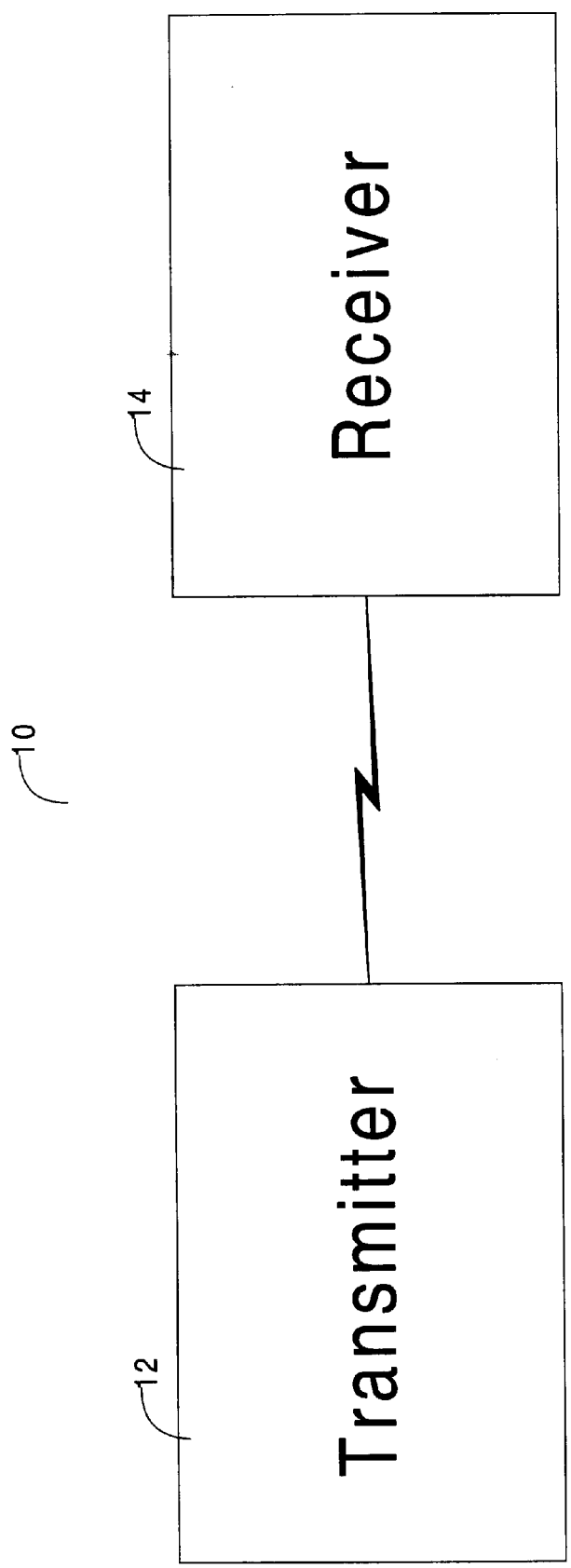
FIG. 1 shows a schematic block diagram of an exemplary system of a transmitter and a receiver according to the background art.

Referring now to the drawings, FIG. 1 shows an exemplary system for communication according to the background art. A system 10 features a transmitter 12 and a receiver 14. Radio-frequency signals are transmitted from transmitter 12 and are received by receiver 14, although of course other types of signals could be substituted. For example, the method of the present invention would also be suitable for voice-band modems. However, for the purposes of clarity only, the following discussion centers upon radio-frequency signals without intending to be limiting in any way.

The signal originates as a digital signal which is processed by transmitter 12 to yield an analog radio-frequency signal before transmission. As described in greater detail below, this processing includes encoding, digital to analog conversion, modulation and then upconversion to the frequency of the transmitted signal.

Receiver 14 receives this analog signal, and then downconverts and demodulates the signal. This demodulated signal is then processed to obtain a digital signal output. The steps of processing the demodulated signal attempt to obtain a digital signal output which is as similar as possible to the original digital signal input at transmitter 12. Again, as described in greater detail below, this processing includes downconversion, demodulation, analog to digital conversion, further processing and then decoding. The further processing is necessary because the analog signal which is received by receiver 14 is not identical to the analog signal which was transmitted by transmitter 12. Alterations occur to the analog signal as a result of interference, radio-frequency carrier offsets and channel response.

Figure 2A:
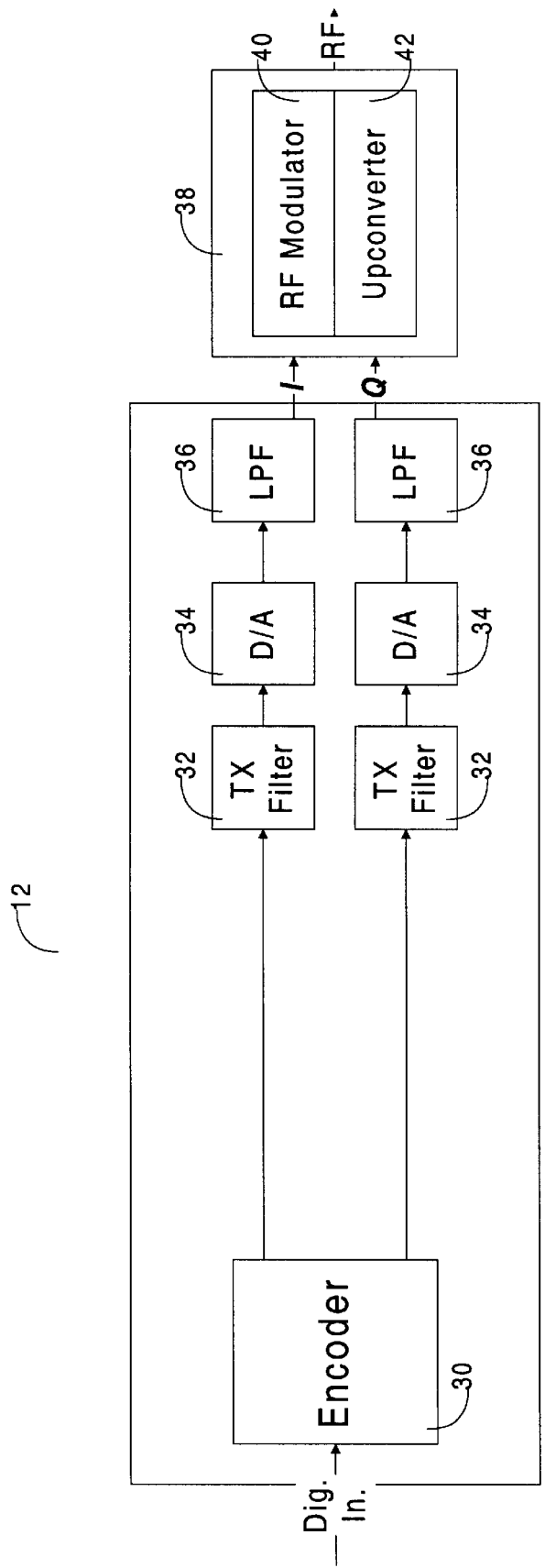
FIG. 2A shows a schematic block diagram of an exemplary transmitter and FIG. 2B shows a schematic block diagram of an exemplary receiver, according to the present invention.
Figure 2B:
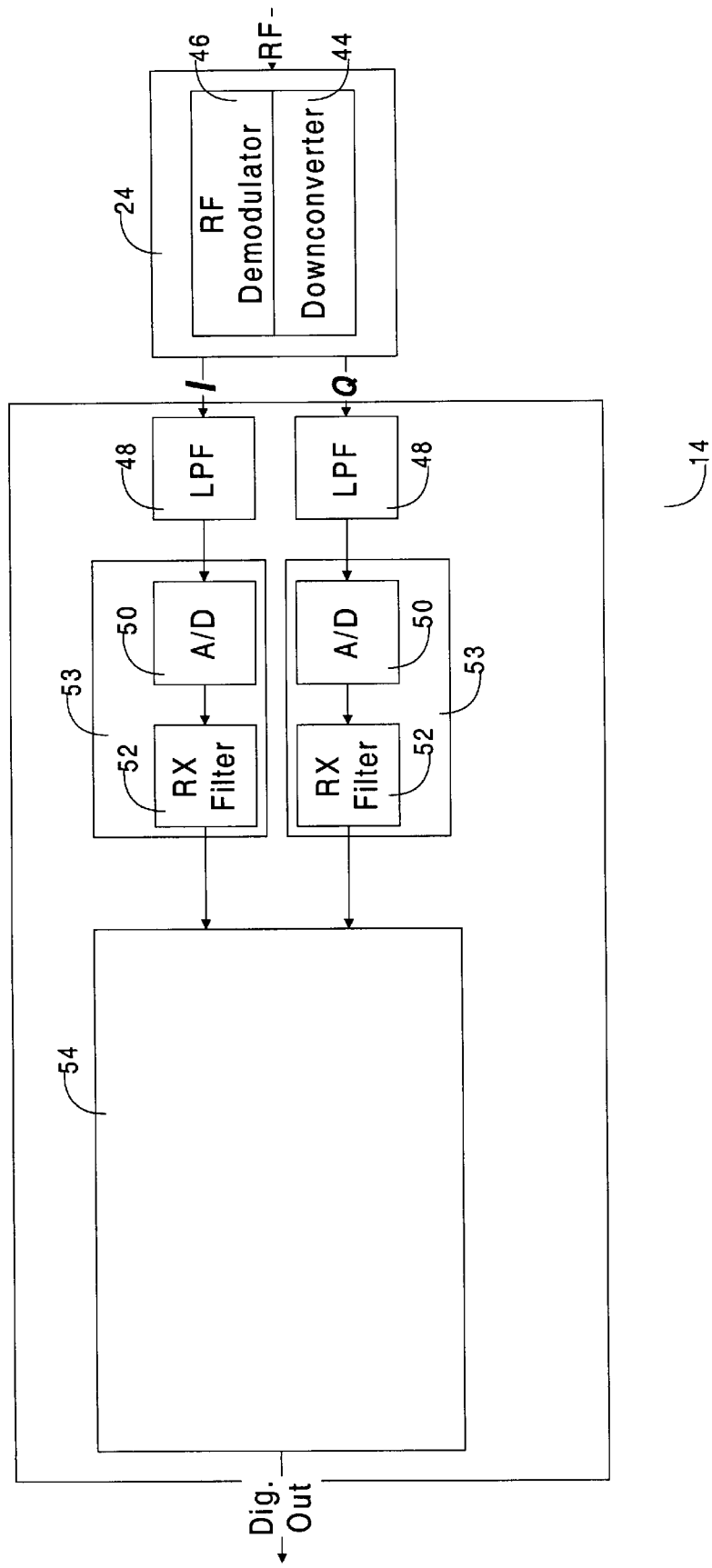

As shown with reference to FIG. 2A for transmitter 12 and FIG. 2B for receiver 14, a number of different components are required or preferred for transmitting the analog signal and for processing the received analog signal. The description of these components is given as an example only for the purposes of discussion and is not intended to be limiting in any way.

In FIG. 2A, transmitter 12 receives a digital input which is received by an encoder 30. Encoder 30 maps the digital bitstream input into symbols. A "symbol" is a k-bit sized chunk into which the transmission signal is divided. The digital signal is then split into two signal components designated as "I" (in phase) and "Q" (quadrature). Each digital signal component is preferably filtered by one of two digital transmit filters 32. Next, the digital signal is converted to an analog signal by one of two digital-to-analog converters 34. The analog signal is then filtered by one of two analog low pass filters 36, designated as "LPF".

The two components of the shaped analog signal are passed to a radio-frequency transmitter unit 38. Radio-frequency transmitter unit 38 preferably includes a modulator 40 and a radio-frequency upconverter 42. Modulator 40 combines the "I" and "Q" components together and modulates these components on a chosen carrier, such that the signal is now an intermediate frequency signal. Radio-frequency upconverter 42 is required to convert the intermediate frequency signal to the frequency of the transmitted radio-frequency signal, which is typically a higher value than the frequency of the intermediate frequency signal.

Turning now to FIG. 2B, the analog radio-frequency signal is received by a radio-frequency receiver unit 24. Radio-frequency receiver unit 24 preferably includes a radio-frequency downconverter 44 and a demodulator 46. Radio-frequency downconverter 44 is required to convert the frequency of the transmitted radio-frequency signal to an intermediate frequency signal. Next, the intermediate frequency signal passes to demodulator 46, which splits the signal into the two components of "I" and "Q".

These two signal components are processed separately by one of two analog low pass filters 48, designated as "LPF". Next, the low pass filtered signals for "I" and "Q" are converted from analog signals to digital signals by one of two analog-to-digital converters 50.

The digital signals then are further processed by one of two digital receive filters 52. Preferably, digital receive filters 52 filter noise to improve the signal to noise ratio. It should be noted that analog-to-digital converters 50 and digital receive filters 52 are also collectively designated an "analog-to-digital processing unit 53". Next, the filtered signal is passed to a receiver back-end 54 to produce a digital output during steady state processing of the signal. However, the method of the present invention is preferably operative during the processing of the synchronization field itself, more preferably before an equalizer has been trained, if such an equalizer is present, and hence more preferably before the signal is equalized.

The digital processing within receiver back-end 54 includes compensation for both carrier frequency offset and phase offset, and for ISI (intersymbol interference). The method of the present invention enables the carrier frequency offset to be estimated much more rapidly and with shorter synchronization fields (described with regard to FIG. 3), as described in greater detail below with regard to FIGS. 4A and 4B.

Figure 3:
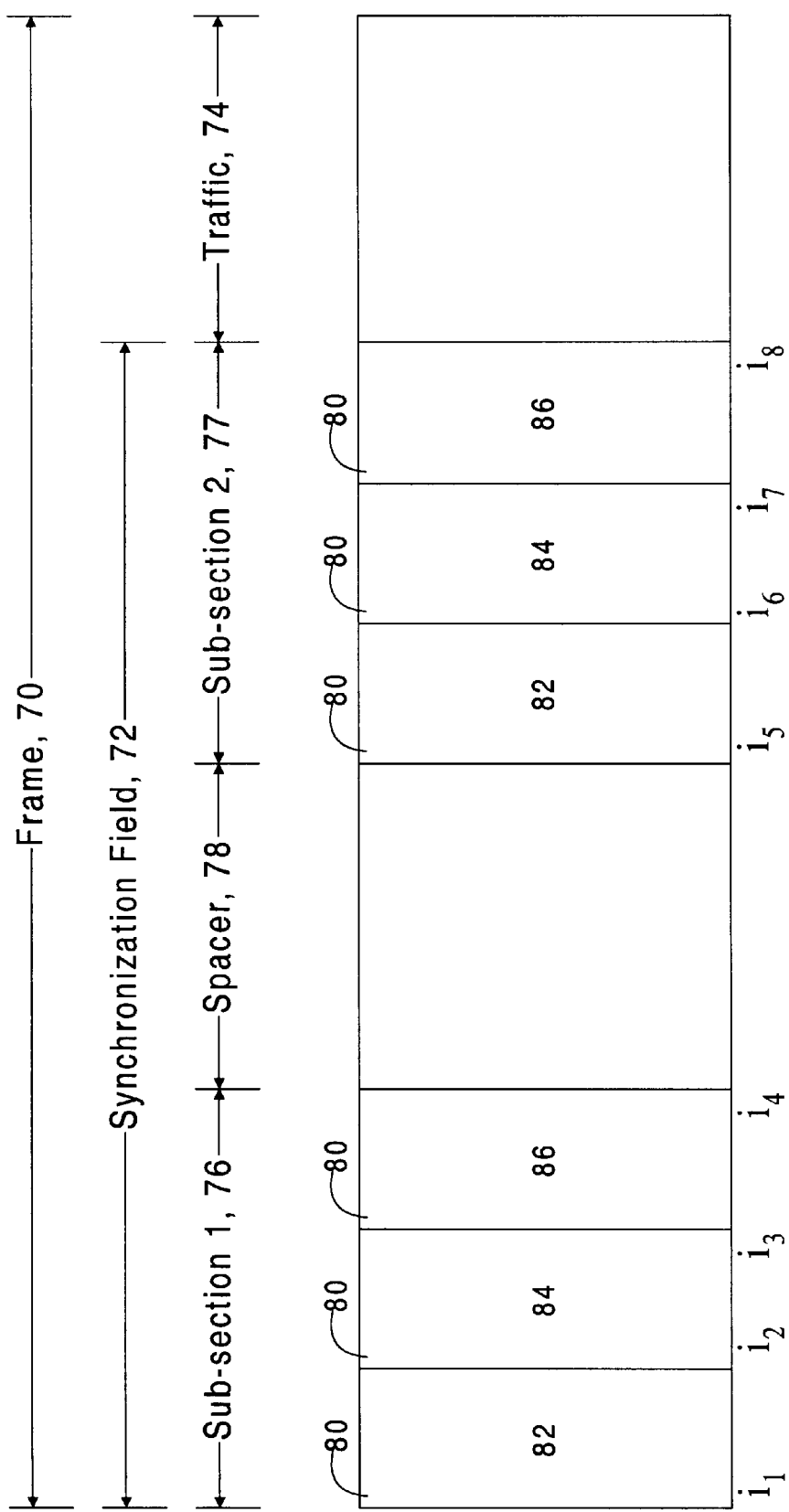
FIG. 3 is an illustration of an exemplary frame structure according to the present invention.

With regard to FIG. 3, every frame 70 includes a synchronization field 72 and a traffic portion 74 (as illustrated, relative proportions are not shown). Synchronization field 72 is present for rapid and efficient synchronization. Synchronization field 72 preferably appears at the beginning of frame 70, in which case synchronization field 72 is the "header" of frame 70.

Synchronization field 72 is optionally divided into at least two subsections 76 and 77, each of which contains a predefined sequence of pseudorandom symbols, and which are preferably substantially equivalent, such that the processing of both subsections 76 and 77 would preferably yield the same or substantially similar ISI. Each subsection 76 and 77 is preferably separated by a spacer portion 78 which is at least of a predefined length. More preferably, the length of spacer portion 78 is preferably similar to that of one subsection 76 or 77.

Also more preferably, each subsection 76 or 77 is further divided into at least three sequences of pseudorandom symbols 80 (hereinafter collectively referred as "sequences 80"), each of which can also be described as a portion of each subsection 76 or 77. Each sequence 80 is composed of a plurality of symbols.

Most preferably, each of the three sequences 80 is a different sequence of pseudorandom symbols. Also most preferably, a first sequence 82 of the three sequences 80 is substantially equivalent for both first subsection 76 (designated as "subsection 1") and for second subsection 77 (designated as "subsection 2"). Similarly, a second sequence 84 is substantially equivalent for both first subsection 76 and for second subsection 77, and a third sequence 86 is also substantially equivalent for both first subsection 76 and for second subsection 77.

For the purposes of illustration and discussion only, for first subsection 76, the first symbol for first sequence 82 is symbol $i_1$; the first symbol for second sequence 84 is symbol $i_2$; the last symbol for second sequence 84 is symbol $i_3$; and the last symbol for third sequence 86 is symbol $i_4$. Similarly, for second subsection 77, the first symbol for first sequence 82 is symbol $i_5$; the first symbol for second sequence 84 is symbol $i_6$; the last symbol for second sequence 84 is symbol $i_7$; and the last symbol for third sequence 86 is symbol $i_8$.

Preferably, for the purposes of the method of the present invention, only second sequence 84 of first subsection 76 and of second subsection 77 are analyzed. However, first sequence 82 and third sequence 86 are both preferably included to minimize distortions of the symbols of second sequence 84 from previous and following symbols, such that symbols $i_2$ through $i_3$ and symbols $i_6$ through $i_7$ are both distorted by ISI to the same, or to a substantially similar, degree. The presence of first sequence 82 of a sufficient length enables the ISI caused by symbols prior to symbol $i_1$ to have substantially decayed by the time symbol $i_2$ is received. Similarly, if third sequence 86 has a sufficient length, then ISI caused by symbols after symbol $i_4$ does not substantially affect symbol $i_3$. Thus, first sequence 82 and third sequence 86 act as ISI buffers for second sequence 84.

For the method of the present invention, preferably the signal processing is at the stage when synchronization field 72 only is being processed by the receiver of a receiver-transmitter pair, and the equalizer is not yet operative, if such an equalizer is present. Therefore, the signal being processed still has ISI (intersymbol interference), and inaccuracies of channel response. More preferably, the signal has already been processed by the receive filters of FIG. 2B, although alternatively the signal could be received directly from the analog-to-digital converters for processing according to the method of the present invention. Furthermore, more preferably synchronization field 72 is the header of frame 70. The type of transmission is optionally bursty, such that frame 70 is a burst, or alternatively the transmissions could be continuous. For either type of transmission, the timing of the reception of synchronization field 72 by the receiver of the receiver-transmitter pair must be predetermined, such that a particular transmission structure is predetermined and is known in advance by the receiver. Alternatively and preferably, the receiver itself could control or determine the transmission structure.

Although the timing of the sampling of the analog-to-digital converter is not necessarily optimal, the timing must at least be consistent from subsection 1 to subsection 2. Optimal timing is preferred because the method of the present invention gives better performance with such optimal timing. If the timing is not optimal but is consistent, then preferably the sampling rate is greater than one sample per symbol, in order to overcome any deficiencies of the sampling timing. One example of a system in which timing is consistent but not optimal is given in U.S. patent application Ser. No. 09/162,995, filed on the same day as this Application, entitled "Method For Rapid Synchronization Of A Point to Multipoint Communication System" and incorporated by reference as if fully set forth herein. In the system disclosed therein, the sampling timing is set by the base station transmit clock, such that the sampling timing of the terminal station and base station receive clocks is set according to the base station transmit clock, and such that the terminal station transmit clock is also determined according to the base station transmit clock. In this system, the base station timing is known and is consistent, but is not necessarily optimal.

Figure 4A:
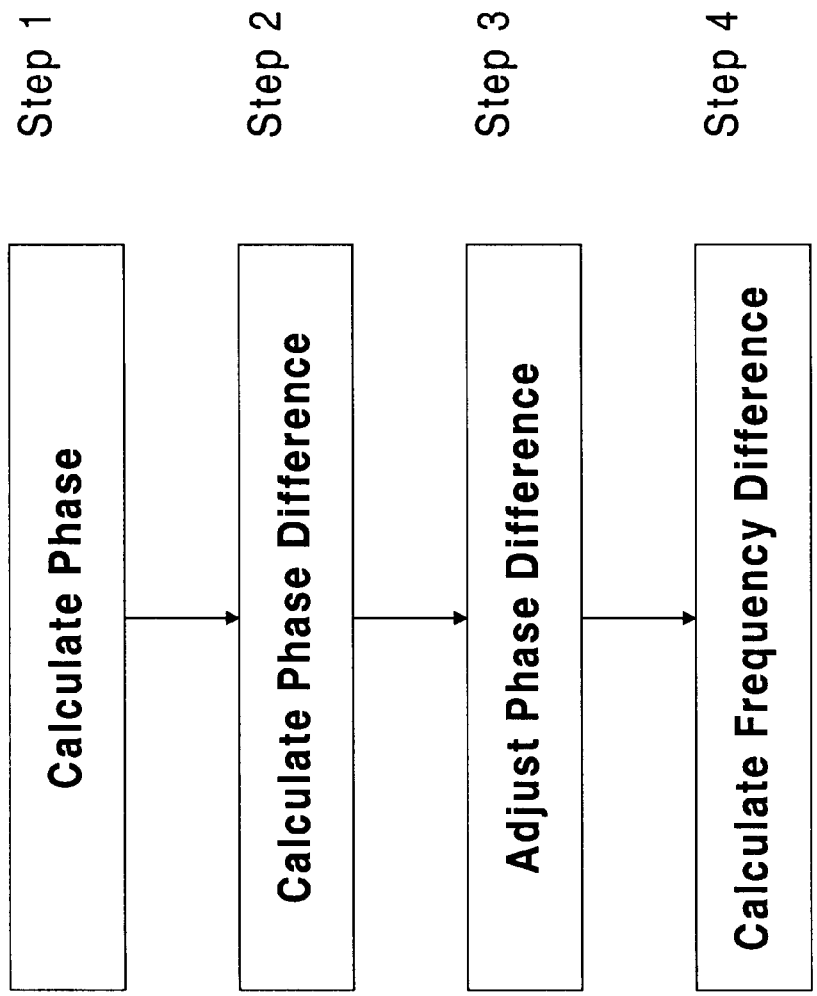
FIGS. 4A and 4B are flowcharts of the method of estimating the carrier frequency offset according to the present invention.

With reference to FIG. 4A, the steps of the method of the present invention are performed as follows, preferably by a data processor in receiver back-end 54, for example as software being stored on a non-volatile memory in receiver back-end 54. Alternatively and preferably, the steps of the method of the present invention could be performed by dedicated hardware, or by a combination of hardware and software, also known as "firmware". One of ordinary skill in the art could easily implement the method of the present invention for functioning as software, hardware, or firmware.

The steps of the method are performed by a receiver which receives at least one frame, containing at least one synchronization field, from a transmitter.

The following notation is employed for these formulae. Bold font indicates column vectors, while elements of a vector are in regular font with a subscript.

Y—Receive filter (analog-to-digital converter) output for beginning of header (column vector)
a—training symbols (column vector)
j—square root of −1
i—subscript denoting time in symbols
$a_i^*$—complex conjugate of $a_i$
angle (x)—if x is a complex valued number, and $x=re^{j\theta}$, where r is real and non-negative, and θ is an angle in radians between −π and π, then angle(x) is defined to be equal to θ.

The steps of the method for every frame are as follows. First, in step 1 the phase for first subsection 76, designated as "subsection 1", of FIG. 3 is estimated using at least a portion of first subsection 76. More preferably, second sequence 84 is processed to estimate the phase, most preferably according to the following equation:

$$\varphi_1 = angle\left(\sum_{i=i_2}^{i_3} a_i^* * Y_i\right)$$

Similarly, the phase for second subsection 77, designated as "subsection 2", of FIG. 3 is estimated using at least a portion of second subsection 77. More preferably, second sequence 84 is employed to estimate the phase, most preferably according to the following equation:

$$\varphi_2 = angle\left(\sum_{i=i_6}^{i_7} a_i^* * Y_i\right)$$

The variable "Y" is designated as either the output of the receive filter or alternatively of the analog-to-digital converter from processing the header, since the values of Y are optionally and preferably received from the receive filter, or alternatively are directly received from the analog-to-digital converter.

A more general expression for these equations is given below for the first equation:

$$\varphi_1 = angle\left(\sum_{i=i_m}^{i_n} a_i^* * Y_i\right)$$

in which n and m are integers, $i_n \geq i_m$, and the length of the portion of the first subsection being processed is given as $i_n - i_m + 1$. In the particular example illustrated above, n=3 and m=2, although of course the values for n and for m could optionally be varied according to the portion of the first subsection being processed.

Similarly, a more general expression for the second equation is:

$$\varphi_2 = angle\left(\sum_{i=i_p}^{i_q} a_i^* * Y_i\right)$$

in which q and p are integers, $i_q \geq i_p$, and the length of the portion of the second subsection being processed is given as $i_q - i_p + 1$. In the particular example illustrated above, q=7 and p=6, although of course the values for q and for p could optionally be varied according to the portion of the second subsection being processed.

Next, the phase difference in radians is calculated in step 2 from the phase calculated from "subsection 1" and the phase calculated from "subsection 2" according to the following equation:

$$\Delta\phi = \phi_2 - \phi_1$$

Next, the difference between the phases is adjusted as follows in step 3. If $\Delta\phi > \pi$, then $\Delta\phi = \Delta\phi - 2\pi$. Alternatively, if $\Delta\phi < -\pi$, then $\Delta\phi = \Delta\phi + 2\pi$.

The phase difference in radians is then converted to a frequency difference in Hertz (Hz) in step 4, which is the estimate of the carrier frequency offset for this frame, according to the following equation:

$$\Delta f = \Delta\phi / (\Delta t * 2\pi)$$

in which:

$$\Delta t = (i_6 - i_2) * T_s$$

such that the difference $(i_6-i_2)$ is the delay between subsection 1 and subsection 2, measured in symbols being processed, and $T_s$ is the symbol period in seconds, such that $\Delta t$ is the delay between subsection 1 and subsection 2, measured in seconds. This calculated frequency difference is the carrier frequency offset, which could be used for the remaining processing of the signal as shown in FIG. 2B.

Preferably, the calculation of the phase in step 1 is weighted, such that the equation of step 1 for first subsection 76 would be replaced by the following equation:

$$\varphi_1 \, angle\left(\sum_{i=i_2}^{i_3} a_i^* * Y_i * v_i\right)$$

in which $v_i$ is the set of weights according to which the phase is weighted to form a weighted phase. For example, a uniform weighting scheme could be used, such that $v_i=1/n$ for all i between 1 and n.

Preferably, these calculations are repeated each time a synchronization field is sent. More preferably, the synchronization field is repeatably transmitted n times, such that n estimates of the carrier frequency offset are calculated and are then averaged to obtain a weighted carrier frequency offset estimate.

According to preferred embodiments of the present invention, preferably the carrier frequency offset is calculated as a weighted average, such that if the synchronization field is repeatably transmitted n times, such that n estimates of the carrier frequency offset are calculated, a weighted carrier frequency offset estimate is preferably calculated in step 5 according to the following equation:

$$\Delta f_w = \frac{1}{\sum_{i=1}^{n} w_i} * \sum_{i=1}^{n} (w_i * \Delta f_i)$$

in which $w_i$ represents a suitable weighting scheme for each frequency offset estimate $\Delta f_i$, and $\Delta f_w$ is the weighted frequency offset estimate. For example, more weight could optionally be given to more recently calculated estimates of the frequency offset, since the frequency varies over time and the more recently calculated estimates of the frequency offset would therefore be based upon more recently received synchronization fields. Alternatively, uniform weighting could be employed, such that $w_i=1/n$ for all i between 1 and n.

The above steps of the method for estimating the frequency offset assume that each symbol is sampled once. For example, if the symbol timing recovery is known to be optimal, then this assumption is correct. However, if the symbol timing recovery is known to be consistent but not optimal, then each symbol may be sampled more than once or "oversampled". In this situation, a certain number of samples must be discarded or "downsampled", such that there is only one sample processed per symbol. For example, if each symbol is sampled twice, then one sample must be kept and one sample must be discarded according to a consistent scheme, such that all even samples or all odd samples are discarded for example. Preferably, this consistent scheme is such that the samples are kept at the most optimum phase.

The advantages of the method of the present invention are as follows. First, the estimate of the phase is degraded both by additive noise and by ISI (intersymbol interference). Since subsections 1 and 2 are identical, both suffer from the same ISI and hence both have the same bias due to ISI. However, since the phase difference is calculated, the bias due to ISI is canceled out of the calculations. Therefore, the method of the present invention remains operative even under conditions of severe ISI and does not require the signal to be equalized.

Preferably, subsections 1 and 2 include one or more sequences of pseudorandom symbols of more than one frequency, to prevent strong attenuation of the received signals if a deep notch exists at a particular frequency. Also, sequences of pseudorandom symbols of a plurality of frequencies are suitable for the adaptation of equalizers, thus permitting one synchronization field to be used for both equalizer adaptation and for the estimate of the carrier frequency offset according to the present invention.

Preferably, there is an initial frequency offset, $f_{initial}$, which is used to calculate the estimated frequency offset, which could be obtained from a coarse frequency estimate as described in further detail below. If the frequency offsets and phase differences are too large, then a two stage approach is particularly preferred. In stage 1, a coarse frequency offset estimate is calculated as the initial frequency offset, while in stage 2, the frequency offset estimate itself, or "fine frequency offset estimate", is calculated. In particular, if the frequency offset is greater than $1/(2\Delta t)$, then the two stage method is strongly preferred.

According to more preferred embodiments of the present invention, the two stage method of the present invention includes the calculation of a coarse frequency offset as $f_{initial}$ prior to the performance of the above steps of the one stage method of the present invention. The assumptions are similar to those described above with regard to the method of FIG. 4A.

Briefly, one example of a two stage method according to the present invention is performed as follows. First, the DFT (discrete Fourier transform) of the sequence $a_i^* \, *Y_i$ is calculated from the synchronization field for a set of frequencies $\{f_k\}$. Next, the maximum absolute value in the frequency domain is determined, and the corresponding frequency is then selected as the coarse estimate. Preferably, since the range of the carrier frequency can be determined to lie between two endpoints $f_{min}$ and $f_{max}$, and the tolerance of the method of FIG. 4A can also be determined as $f_{tol}$, then the set of frequencies $\{f_k\}$ between $f_{min}$ and $f_{max}$ is chosen such that the error of the coarse estimate is no greater than $f_{tol}$.

Figure 4B:
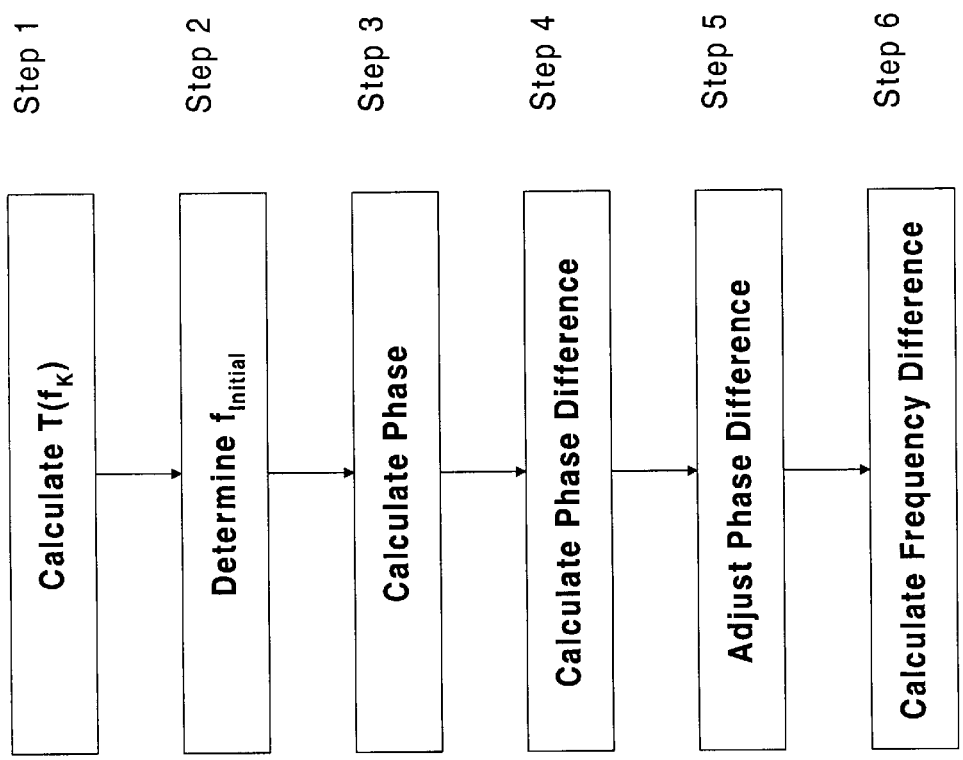

The steps of the method are as shown in FIG. 4B. Unless otherwise noted, all variables and subscripts are as for the steps of the method shown in FIG. 4A and described above. First, in step 1, for each $f_k$ of the set of frequencies $\{f_k\}$, the following equation is calculated:

$$T(f_k) = \left|\sum_{i=1}^{L} a_i * \exp(-j * i * f_k * 2\pi * T_s) * Y_i\right|^2$$

in which L is the length of the synchronization field.

In step 2, $f_{initial}$ is determined as the value of the frequency $f_k$ for which the set of values $T(f_k)$ is maximized.

Next, in step 3 the phase in radians for first subsection 76, designated as "subsection 1", of FIG. 3 is estimated according to the following equation:

$$\varphi_1 = angle\left(\sum_{i=i_2}^{i_3} a_i^* * \exp(-j * i * f_{initial} * 2\pi * T_s)Y_i\right)$$

Similarly, the phase in radians for second subsection 77, designated as "subsection 2", of FIG. 3 is estimated according to the following equation:

$$\varphi_2 = angle\left(\sum_{i=i_6}^{i_7} a_i^* * \exp(-j * i * f_{initial} * 2\pi * T_s)Y_i\right)$$

In step 4, the difference in radians is calculated from the phase calculated from "subsection 1" and the phase calculated from "subsection 2" according to the following equation:

$\Delta\phi=\phi_2-\phi_1$

Next, the difference between the phases is adjusted as follows in step 5. If $\Delta\phi>\pi$, then $\Delta\phi=\Delta\phi-2\pi$. Alternatively, if $\Delta\phi<-\pi$, then $\Delta\phi=\Delta\phi+2\pi$.

The phase difference is then converted to a frequency difference in Hertz (Hz) in step 7, which is the estimate of the frequency for this frame, according to the following equation:

$\Delta f = \Delta\phi/(\Delta t * 2\pi) + f_{initial}$ in which:

$\Delta t = (i_6 - i_2) * T_s$ such that the difference $(i_6-i_2)$ is the delay between subsection 1 and subsection 2, measured in symbols, and $T_s$ is the symbol period in seconds, such that $\Delta t$ is the delay between subsection 1 and subsection 2, measured in seconds. This calculated frequency difference is the carrier frequency offset, which could be used for the remaining processing shown in FIG. 2.

While the invention has been described with respect to a limited number of embodiments, it will be appreciated that many variations, modifications and other applications of the invention may be made.

What is claimed is:

1. A method for estimating a frequency offset of at least one frame, containing at least one synchronization field being divided into at least two subsections, the at least two subsections being composed of substantially equivalent pseudorandom symbols, the frame being received by a receiver from a transmitter, the receiver including at least an analog-to-digital processing unit, the steps of the method being performed by a data processor, the steps of the method comprising:

(a) determining an initial frequency offset, $f_{initial}$;

(b) calculating a first phase in radians for at least a portion of a first subsection according to an equation:

$$\varphi_1 = angle\left(\sum_{i=i_m}^{i_n} a_i^* * \exp(-j * i * f_{initial} * 2\pi * T_s)Y_i\right)$$

wherein i denotes time in symbols; $T_s$ is a symbol period; n and m are integers, $i_n \geq i_m$; a length of said at least portion of said first subsection is $i_n - i_m + 1$; $Y_i$ is an output of the analog-to-digital processing unit; $a_i^*$ is the complex conjugate of the $i^{th}$ training symbol $a_i$;

(c) calculating a second phase in radians for at least a portion of a second subsection according to an equation:

$$\varphi_2 = angle\left(\sum_{i=i_p}^{i_q} a_i^* * \exp(-j * i * f_{initial} * 2\pi * T_s)Y_i\right)$$

wherein q and p are integers, $i_q \geq i_p$; a length of said at least a portion of said second subsection is $i_q - i_p + 1$;

(d) calculating a phase difference of said first phase and said second phase angle according to an equation:

$\Delta\phi=\phi_2-\phi_1$;

(e) adjusting said phase difference such that if $\Delta\phi>\pi$, then $\Delta\phi=\Delta\phi-2\pi$, and alternatively such that if $\Delta\phi<-\pi$, then $\Delta\phi=\Delta\phi+2\pi$, and (f) calculating the frequency offset according to an equation:

$\Delta f = \Delta\phi/(\Delta t * 2\pi)$ wherein $\Delta t = (i_p - i_m) * T_s$;

wherein the steps of the method are repeated for a plurality of frames n, such that a plurality of n frequency offsets is calculated, the method further comprising the step of:

(g) averaging said plurality of n frequency offsets, by steps including:

(i) determining a weight $w_i$ for each frequency offset i, and (ii) calculating the frequency offset to be $\Delta f_w$ according to an equation:

$$\Delta f_w = \frac{1}{\sum_{i=1}^{n} w_i} * \sum_{i=1}^{n} (w_i * \Delta f_i).$$

* * * * *